July 15, 1952  A. W. PAYNE  2,603,343

FEEDING MEANS FOR TUBE AND OTHER LONG WORKPIECES

Filed May 8, 1947  2 SHEETS—SHEET 1

INVENTOR.
Arthur W. Payne
BY
Barnes, Kisselle, Laughlin & Raisch
ATTORNEYS.

July 15, 1952     A. W. PAYNE     2,603,343
FEEDING MEANS FOR TUBE AND OTHER LONG WORKPIECES
Filed May 8, 1947     2 SHEETS—SHEET 2

INVENTOR.
Arthur W. Payne
BY
Barnes, Kisselle, Laughlin & Raisch
ATTORNEYS.

Patented July 15, 1952

2,603,343

UNITED STATES PATENT OFFICE 2,603,343

FEEDING MEANS FOR TUBE AND OTHER LONG WORKPIECES

Arthur W. Payne, Detroit, Mich., assignor to Bundy Tubing Company, Detroit, Mich., a corporation of Michigan Application May 8, 1947, Serial No. 746,705

12 Claims. (Cl. 198—127)

This invention relates to feeding means for tubing or other long work pieces such as wire or rod, and it has to do particularly with feeding means of the type having cooperating engaging rollers for engaging and propelling the work pieces with lengthwise movement.

Heretofore, it has been a common practice to feed such work pieces lengthwise by means of cooperating driving rollers provided with a peripheral facing of rubber or other resilient material, which rollers were so positioned on different axes that the work pieces were engaged between the peripheral surfaces of the rubber facings. Driving rollers of this type, theoretically engage the work pieces at opposite points, and in order to establish sufficient friction for driving purposes, it was necessary to apply the rollers to the work pieces with considerable pressure thus flattening out and distorting the rubber facings. Accordingly, in addition to the added pressure, the area of engagement was increased due to the flattening of the rubber. This, of course, resulted in rapid wear of the facing material, the same soon becoming grooved. As the groove wore in the facing material, the speed of the feeding movement decreased with the resultant decrease in effective diameter of the feeding rolls. In some cases, difficulties were encountered when feeding a light thin-walled tube as there was a danger of distorting the tube wall. Feeding rolls of this type have such a rapid wear that it was not unusual, in the case of one day's production in a manufacturing plant, to change the rolls several times.

The general objects of the present invention is to provide a feeding means of an improved nature which will overcome these defects and which otherwise will provide a better and more efficient feeding operation and longer life in the feeding rollers. To this end, the feeding means of the present invention resides basically in a pair of feeding rollers provided with material for engaging the work pieces to propel the same lengthwise and this material or facings, as they may be termed, engage the work piece with radial faces, as distinguished from peripheral faces. In this connection, a construction is arranged to positively guide and hold the work pieces in a fixed position relative to the axes of the rollers; that is to say, the work pieces are prevented from shifting radially relative to the faces of the driving rolls. With this arrangement, the facing material engages the work pieces over a relatively long line of contact resulting in less distortion of the rubber and even permitting the employment of a harder facing substance, such as harder rubber, for effecting greater life. As the facing material wears, the radius remains constant and, therefore, the driving speed remains constant throughout the life of the rubber facings. The facings wear off quite uniformly and the feeding action is as efficient near the end of the life of the facings as it is at the beginning. Due to the light pressure required there is no damage of distorting a light, thin-walled tube. Moreover, while the feeding action is positive, the rollers may slip on the tube in the event the tube is jammed and thus the feeding rollers serve as their own safety device making it unnecessary to employ an overload clutch or other safety element.

The term "rubber" is used herein as descriptive of a facing material but it will be understood that, insofar as the invention is concerned, any resilient material may be employed, such as natural rubber, one of the synthetic rubbers, or a combination thereof, or other suitable plastic.

The invention is disclosed in the accompanying drawings which show a mechanism embodying a pair of driving rollers constructed in accordance with the invention.

Figure 1:
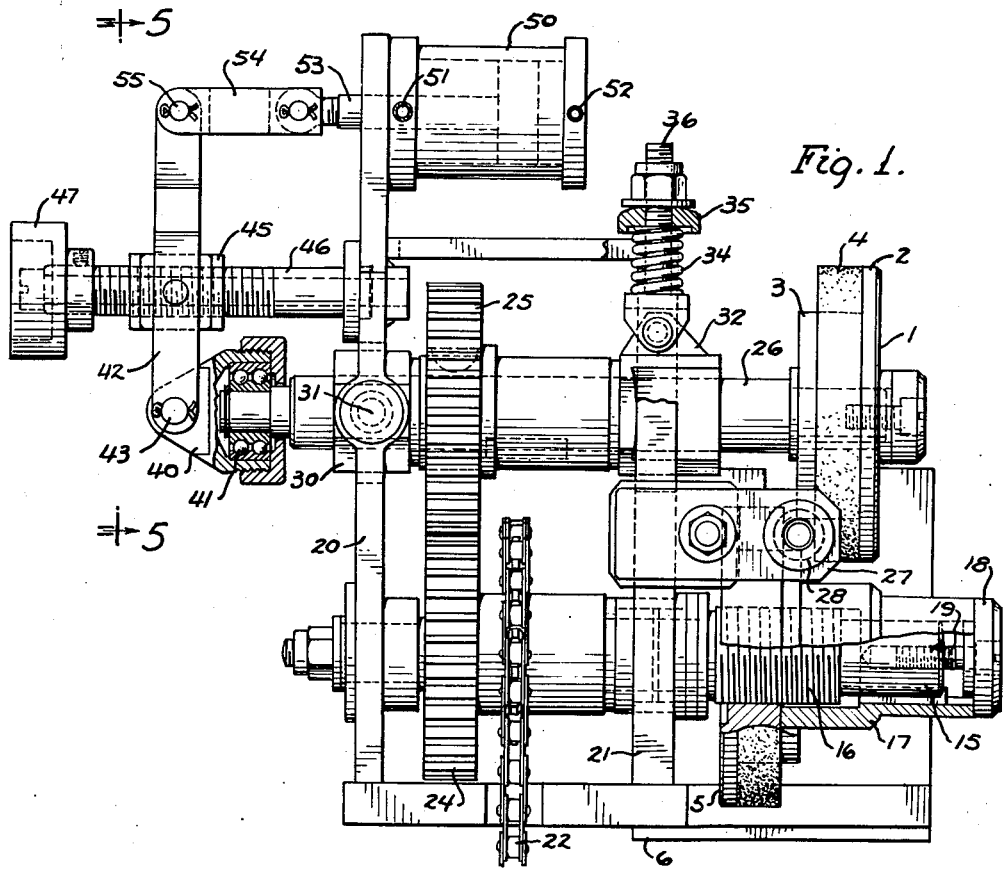
Fig. 1 is a view of the feeding mechanism looking from the side thereof into which the work piece passes.

One of the driving rollers is illustrated at 1 and it is provided with a flange 2 and a part of reduced diameter 3 upon which is mounted a facing of suitable resilient engaging and driving material 4. This may be rubber, as aforesaid, and it is preferably in the form of a ring seated on the portion 3, and abutting the flange 2. The other driving roller is illustrated at 5 and it is similarly constructed with a flange 6, a part of reduced diameter as at 7, and a ring of facing material 8. One way of carrying out the invention is to mount the rollers on displaced axes as shown, but basically the idea is that of having the driving rollers so relatively positioned axially as to engage the tube with radial faces.

Figure 2:
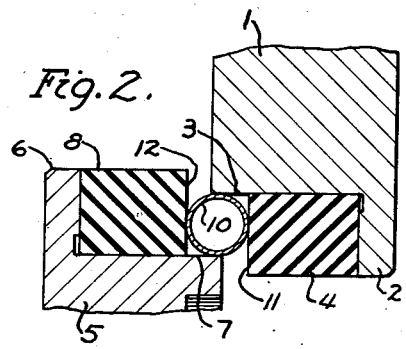
Fig. 2 is an enlarged cross sectional view taken through the driving rollers and illustrating the engagement with a work piece.

A work piece in the form of a tube 10 is shown in Fig. 2 as engaged between the rings 4 and 8 and specifically in engagement with the radial faces 11 and 12 thereof. These two rolls or rollers, as they may be termed, are so positioned on axes that they are axially displaced from each other as shown in Fig. 1, and so that they overlap each other radially. The construction is such that, with reference to the particular work piece employed, the work piece is engaged between the peripheral surfaces of the offset portions 3 and 7 as shown in Fig. 2. Thus, the work piece is held fixedly positioned relative to the axes of the two rollers and the work piece is engaged at opposite sides by the faces 11 and 12 of the resilient facing rings.

There is a shaft or axis member 15 for the roller 5 and this roller is preferably mounted on the shaft by means of screw threads 16 so that it may be adjusted axially upon the shaft, and the roller may be clamped in position by a sleeve 17 which fits over the end of the shaft, abuts against the roller 5, and which may be clamped in position by a cap 18 held by a screw 19. This shaft is journalled in suitable supports 20 and 21 by means of suitable bearings and is driven in a suitable manner as, for example, by a driving chain 22. A gear 24 on the shaft 15 operates a gear 25 on a shaft 26 upon which the roller 1 is mounted. Thus, both driving rollers are driven. There is a bracket 27 for receiving a guide pipe 28 which serves to guide the work piece 10 into its proper position.

The shaft 26 is movably mounted for the purpose of adjustable action of the roller 1, relative to the roller 5, and in this connection, there is a bearing 30 for the shaft and this bearing is pivotally mounted in the bracket 20 for movement about an axis 31. The shaft 26 is also journalled in a block 32 mounted in a guideway 33 in the support 21 and a coil spring 34 acts upon the block 32 and reacts against a cap 35 mounted on the support 21. Extending through the spring is a rod 36 provided with a clevis which is connected to the block 32 by a pin 37. The spring urges the shaft 26 downwardly to thus yieldably engage the work piece between the peripheral portions 3 and 7 of the rollers. In this action, the shaft 26 may pivot about the axis 31.

The shaft 26 is also axially shiftable and this axial shift facilitates introduction of the work piece between the faces 11 and 12 of the rubber driving rings. For this purpose, there is a fitting 40 mounted on the end of the shaft through the means of a bearing 41, which is preferably an anti-friction bearing, and a lever 42 having a yoke formation is attached to the fitting by a pin 43. The fulcrum for this lever is in the form of an element 45 with a screw threaded mounting on a stub shaft 46 provided with an operating handle 47. For actuating the lever, there is a means, such as an air cylinder 50, having ports 51 and 52 at opposite ends into which compressed air may be introduced and having a piston rod 53 connected by means of a link 54 to the end of the lever 42 opposite the pin 43. This connection is by means of a pin 55.

Figure 6:
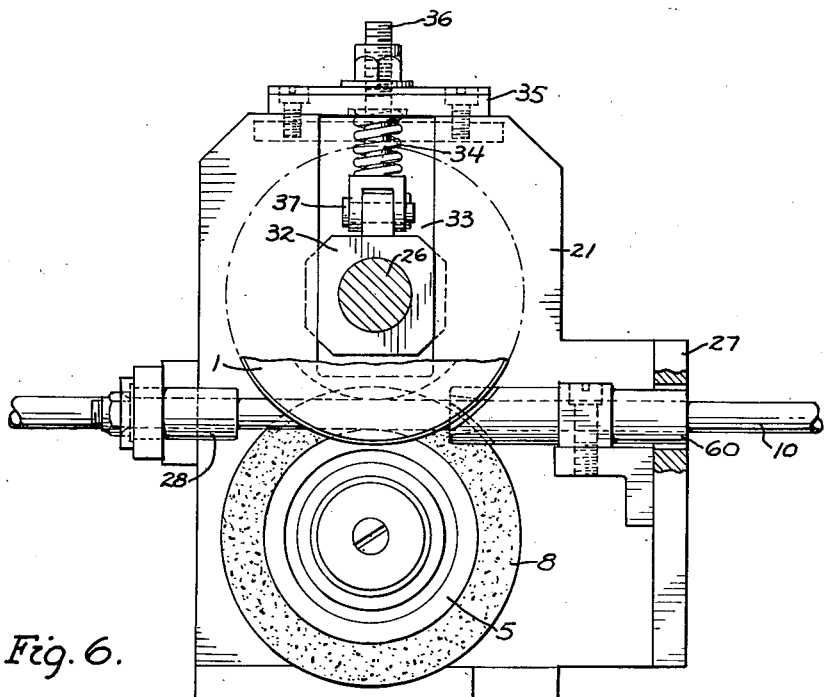
Fig. 6 is a view of the side of the mechanism, looking from the right side of Fig. 1 with parts cut away and parts in section showing further features of construction.

As shown in Fig. 6, the movement of the tube relative to the driving rollers is from left to right, and a guide device, such as a short piece of guide pipe 60, may be positioned just downstream from the position of the rollers and opposite the position of the guide 28.

Figure 3:
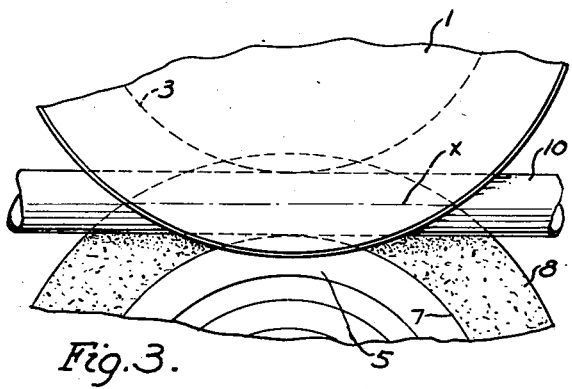
Fig. 3 is an enlarged side elevational view showing a work piece engaged in the driving rollers.
Figure 4:
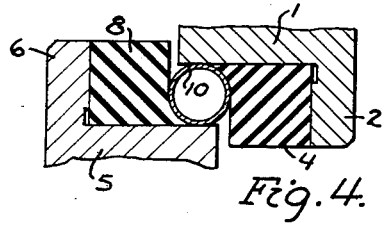
Fig. 4 is a view similar to Fig. 2 illustrating the condition which may exist after some wear of the facing material.
Figure 5:
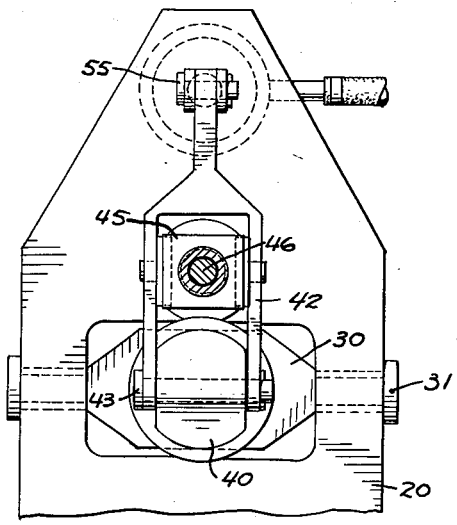
Fig. 5 is a view taken substantially on line 5—5 of Fig. 1 illustrating some of the mechanical construction.

In the operation of the feeding means, the rollers are, of course, driven by the mechanism recited. When a work piece is to be introduced into the feeding mechanism, air may be caused to enter the cylinder 50 through the port 52. This rocks the lever 42 and shifts the shaft 26 and the driving roller 1 to the right and away from the driving roller 5. Upon release of air pressure at the port 52 and entrance of air under pressure through port 51, the driving roller 1 is shifted to the left and the work piece is yieldably engaged between the facing rings. The work piece, shown as a tube, is engaged with somewhat of a line contact of a considerable length as indicated by the line $x$ of Fig. 3. The rotation of the driving rollers advances the tube. While there is some rubbing or scrubbing action against the sides of the tube, the pressure may be relatively light thus reducing wear. This rubbing or scrubbing action is across the radial faces 11 and 12 and, therefore, no groove is worn. As the facings wear the radial faces 11 and 12 remain substantially radial except that the wear of the facing material adjacent the surfaces 3 and 4 is not so great as elsewhere. This is indicated in Fig. 4. The flexibility of the air control for the driving roller 1 is capable of accommodating for some wear of the facings, but as the worn facings cause a shift to the left, as Fig. 1 is viewed, too great a distance, an adjustment for wear may be made by adjusting the roller 5 on its screw threads 16 to bring it back to a proper initial starting position. Then, too, the reciprocatory action of the roller 1 may be adjustably varied by turning the stub shaft 46 thus shifting the fulcrum of the lever 42. A construction of this type has been proven in use as having a life many times that of driving rolls performing a similar operation and engaging the work pieces with their peripheral surfaces. It has been found that the facings of a pair of rollers constructed in accordance with this invention have lasted over a period of several weeks where there was regular daily operation, whereas the older type of roller doing the same work and engaging the work pieces with peripheral surfaces were often required to be changed several times in the course of one day's operation.

I claim:

1. Driving means for propelling lengthwise, work pieces such as tube or the like, comprising, a pair of rollers, said rollers being mounted so that they are normally displaced axially relative to each other and so that the rollers have substantially radially disposed faces adjacently positioned and adapted to receive a work piece therebetween, at least one of the faces being of a resilient material, means for yieldably urging the rollers relatively axially to yieldably engage the work piece therebetween, and means for driving at least one of the rollers.

2. Driving means for propelling lengthwise, work pieces such as tube or the like, comprising, a pair of rollers, said rollers being mounted and disposed axially relative to each other so that the rollers have overlapping substantially radially disposed faces adjacently positioned and adapted to receive a work piece therebetween, means for yieldably urging the rollers relatively axially to yieldably engage the work piece therebetween, and means for driving at least one of the rollers.

3. Driving means for propelling lengthwise, work pieces such as tube or the like, comprising, a pair of rollers, said rollers being mounted so that they are normally displaced axially relative to each other and so that the rollers have substantially radially disposed faces adjacently positioned and adapted to receive a work piece therebetween, at least one of the faces being of a resilient material, means for yieldably urging the rollers relatively axially to yieldably engage the work piece therebetween, guide means for holding the work piece substantially immovable in a direction transversely of the axes and means for driving at least one of the rollers.

4. Driving means for propelling lengthwise, work pieces such as tube or the like, comprising, a pair of rollers, said rollers being mounted on spaced axes and being disposed axially relative to each other so that the rollers overlap each other, said rollers having substantially radially disposed faces adapted to receive a work piece therebetween at the location of the overlap, means for yieldably urging the rollers relatively axially to yieldably engage the work piece therebetween, and means for driving at least one of the rollers.

5. Driving means for propelling lengthwise work pieces, such as tube or the like, comprising, a pair of rollers so positioned and disposed axially relative to each other as to have overlapping radially disposed faces adjacently positioned for receiving a work piece therebetween, means acting upon at least one of the rollers to provide a yieldable frictional engagement with the work piece, and means for driving at least one of the rollers.

6. Driving means for propelling lengthwise work pieces, such as tube or the like, comprising, a pair of rollers so positioned on spaced axes and disposed axially relative to each other as to overlap each other for receiving a work piece therebetween at the location of the overlap, at least one of the rollers having a body of resilient material for yieldably engaging the work piece and means for driving at least one of the rollers.

7. Driving means for propelling lengthwise work pieces, such as tube or the like, comprising, a pair of rollers, said rollers being mounted on spaced axes and being displaced axially relative to each other so that the rollers overlap each other, each roller having a body of resilient material adapted to frictionally engage a work piece substantially between radial faces thereof at the overlap, each roller having a peripheral portion with the portions engaging the work piece on opposite sides and each of the points substantially 90° removed from the engagement of the work piece by the resilient material, and means for driving at least one of the rollers to propel the work piece lengthwise.

8. Driving means for propelling lengthwise work pieces, such as tube or the like, comprising, a pair of rollers, said rollers being mounted on spaced axes so as to overlap each other, each roller having a peripheral surface and a flange portion on a radius greater than the peripheral surface, each roller having a ring of resilient material seated on the peripheral portion and abutting the flange portion, the rollers adapted to receive the work piece therebetween at the overlap with the said peripheral portions of the rollers engaging oppsite sides of the work piece to hold the work piece in a fixed position transversely of the axes, means yieldably urging one of the rollers axially to cause the resilient material on the rollers to engage the work piece at opposite points on the work piece with said points removed substantially 90° from the points engaged by the said peripheral surfaces, and means for driving at least one of the rollers to propel the work piece lengthwise by the frictional engagement therewith by the resilient material.

9. Driving means for propelling lengthwise pieces of work, such as tube or the like, comprising, a pair of rollers, means for driving at least one of the rollers, said rollers being mounted on displaced axes, said rollers having substantially aligned portions for engaging the work on opposite sides to hold the work piece positioned relative to the two rollers, yielding means for causing said peripheral portions to engage the work piece, said rollers having axially disaligned and overlapping portions, said overlapping portions comprising resilient material such as rubber, said overlapping portions engaging the work piece on opposite sides and serving to propel the same.

10. Driving means for propelling lengthwise pieces of work, such as tube or the like, comprising, a pair of rollers, means for driving at least one of the rollers, said rollers being mounted on displaced axes, said rollers having substantially aligned portions for engaging the work on opposite sides to hold the work piece positioned relative to the two rollers, yielding means for causing said peripheral portions to engage the work piece, said rollers having axially disaligned and overlapping portions, said overlapping portions comprising resilient material such as rubber, said overlapping portions engaging the work piece on opposite sides and serving to propel the same, means operable to urge yieldingly the overlapping portions of the rollers toward each other for engagement thereof with the work piece.

11. Driving means for propelling lengthwise pieces of work, such as tube or the like, comprising, a pair of rollers, means for driving at least one of the rollers, said rollers being mounted on displaced axes, said rollers having substantially aligned portions for engaging the work on opposite sides to hold the work piece positioned relative to the two rollers, yielding means for causing said peripheral portions to engage the work piece, said rollers having axially disaligned and overlapping portions, said overlapping portions comprising resilient material such as rubber, said overlapping portions engaging the work piece on opposite sides and serving to propel the same, and operating means for causing relative axial shift of the rollers to establish and disestablish the driving engagement with the work piece.

12. Driving means for propelling lengthwise work pieces, such as tube or the like, comprising, a pair of rollers, means for driving at least one of the rollers, said rollers being mounted normally displaced axially relative to each other so that radially disposed faces thereof are adjacently positioned and adapted to receive a work piece therebetween, means for engaging the work piece to hold the same against lateral shifting movement radially relative to the rollers, said faces of the rollers comprising resilient material, such as rubber, and operating means for causing the said faces to engage the work piece to propel the same and for causing relative axial shift of the rollers to establish and disestablish the driving engagement with the work piece.

ARTHUR W. PAYNE.

REFERENCES CITED

The following references are of record in the file of this patent:

UNITED STATES PATENTS

| Number | Name | Date |
| --- | --- | --- |
| 437,208 | Kinney | Sept. 30, 1890 |
| 2,402,293 | Nye | June 18, 1946 |